United States Patent
Kitayama et al.

(10) Patent No.: US 8,665,681 B2
(45) Date of Patent: Mar. 4, 2014

(54) OPTICAL DISC DRIVE

(75) Inventors: Akira Kitayama, Hachioji (JP); Tatemi Ido, Kodaira (JP); Nobuaki Sato, Yokohama (JP); Hiroharu Sakai, Tokyo (JP); Kouichi Ihara, Yokohama (JP)

(73) Assignee: Hitachi-Lg Data Storage, Inc., Tokyo (JP)

( * ) Notice: Subject to any disclaimer, the term of this patent is extended or adjusted under 35 U.S.C. 154(b) by 867 days.

(21) Appl. No.: 12/285,821

(22) Filed: Oct. 15, 2008

(65) Prior Publication Data

US 2009/0103406 A1    Apr. 23, 2009

(30) Foreign Application Priority Data

Oct. 19, 2007 (JP) .................................. 2007-271948

(51) Int. Cl.
*G11B 7/00*    (2006.01)
(52) U.S. Cl.
USPC ......................................................... 369/119
(58) Field of Classification Search
USPC ................... 369/47.5; 375/257, 317
See application file for complete search history.

(56) References Cited

U.S. PATENT DOCUMENTS

| | | | |
|---|---|---|---|
| 6,226,330 B1* | 5/2001 | Mansur | 375/257 |
| 7,570,714 B2* | 8/2009 | Hori et al. | 375/317 |
| 2006/0087946 A1 | 4/2006 | Fukushima | |
| 2007/0127351 A1* | 6/2007 | Fukushima | 369/116 |

FOREIGN PATENT DOCUMENTS

| | | |
|---|---|---|
| JP | 2006-120252 | 10/2004 |
| JP | 2007-141406 | 11/2005 |

* cited by examiner

*Primary Examiner* — Joseph Haley
(74) *Attorney, Agent, or Firm* — Stites Harbison PLLC; Juan Carlos A. Marquez, Esq.; Nicholas B. Trenkle (57) ABSTRACT

There is provided an optical disc drive comprises an optical pick-up including a laser diode (LD) and a laser diode driver (LDD) for driving the laser diode, a digital signal processor (DSP) including a write strategy circuit and low voltage differential signaling (LVDS) drivers for transmitting a produced write strategy signal, a circuit board having the DSP mounted thereon and including a line for transmitting the write strategy signal, a transmission line connecting the circuit board and the LDD and transmitting a write strategy signal, and differential resistors connected between differential lines of outputs of the LVDS drivers. Especially, a resistor having a resistance value in a range of 80 to 500Ω is inserted between the differential lines of outputs of the LVDS driver inside the DSP.

5 Claims, 11 Drawing Sheets

*Prior Art*

OPTICAL DISC DRIVE

CROSS-REFERENCE TO RELATED APPLICATION

The present application claims priority from Japanese Patent Application No. JP 2007-271948 filed on Oct. 19, 2007, the content of which is hereby incorporated by reference into this application.

FIELD OF THE INVENTION

The present invention relates to an optical disc drive. More particularly, the present invention relates to an optical disc drive compliant with high-speed recording, which produces a laser-drive current pattern from a write strategy signal waveform to record data on an optical disc.

BACKGROUND OF THE INVENTION

Conventionally, as a technique regarding an optical disc drive, a technique for producing a write strategy signal in a signal processing integrated circuit device (digital signal processor: DSP) to differentially transmit the same to a laser diode driver (LDD) has been disclosed (see Japanese Patent Application Laid-Open Publication No. 2007-141406 (Patent Document 1) and Japanese Patent Laid-Open Application Publication No. 2006-120252 (Patent Document 2), for example).

SUMMARY OF THE INVENTION

Figure 6A:
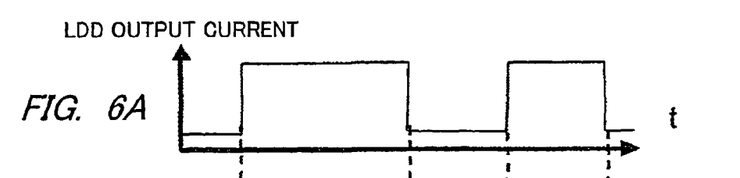
FIGS. 6A-6G are diagrams showing examples of a shape of a recording mark with respect to a laser diode driver (LDD) output waveform (recording waveform) and showing how application of write strategy influences a recording waveform and a recording mark corresponding to the recording waveform.
Figure 6B:
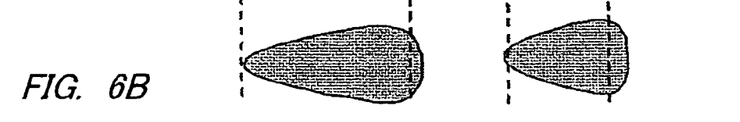
Figure 6C:
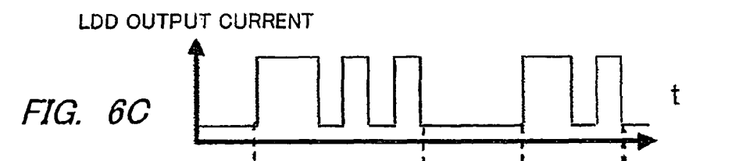
Figure 6D:
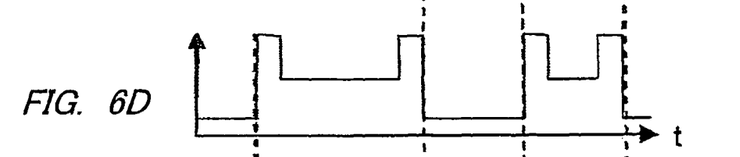
Figure 6E:
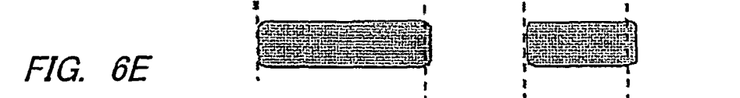
Figure 6F:
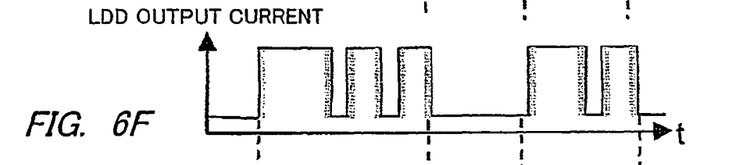
Figure 6G:
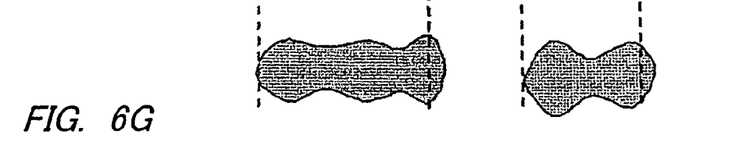

FIGS. 6A-6G are diagrams showing how application of the write strategy influences a recording waveform and a recording mark corresponding thereto. FIG. 6A shows a waveform before application of write strategy, FIG. 6B shows an example of a recording mark corresponding to FIG. 6A, FIG. 6C shows an example of a waveform obtained upon application of write strategy, FIG. 6D shows another example of a waveform obtained upon application of write strategy, FIG. 6E shows another example of a recording mark corresponding to FIG. 6C and FIG. 6D, FIG. 6F shows an example of a waveform obtained when jitter occurs in a write strategy waveform, and FIG. 6G shows an example of a recording mark corresponding to FIG. 6F.

In an optical disc drive, when such a waveform as shown in FIG. 6A is used as a drive current waveform of a laser diode (LD) for recording data on an optical disc, a distortion is made at a recording mark or an edge in a portion where the heat distribution is concentrated, as shown in FIG. 6B, so that an error occurs when reading data. To solve this problem, an optical disc drive is configured such that heat distribution at the time of reading data is controlled by using LD drive current waveforms of FIG. 6C and FIG. 6D, called "write strategy waveform," so that a recording mark as shown in FIG. 6E is realized.

Figure 11:
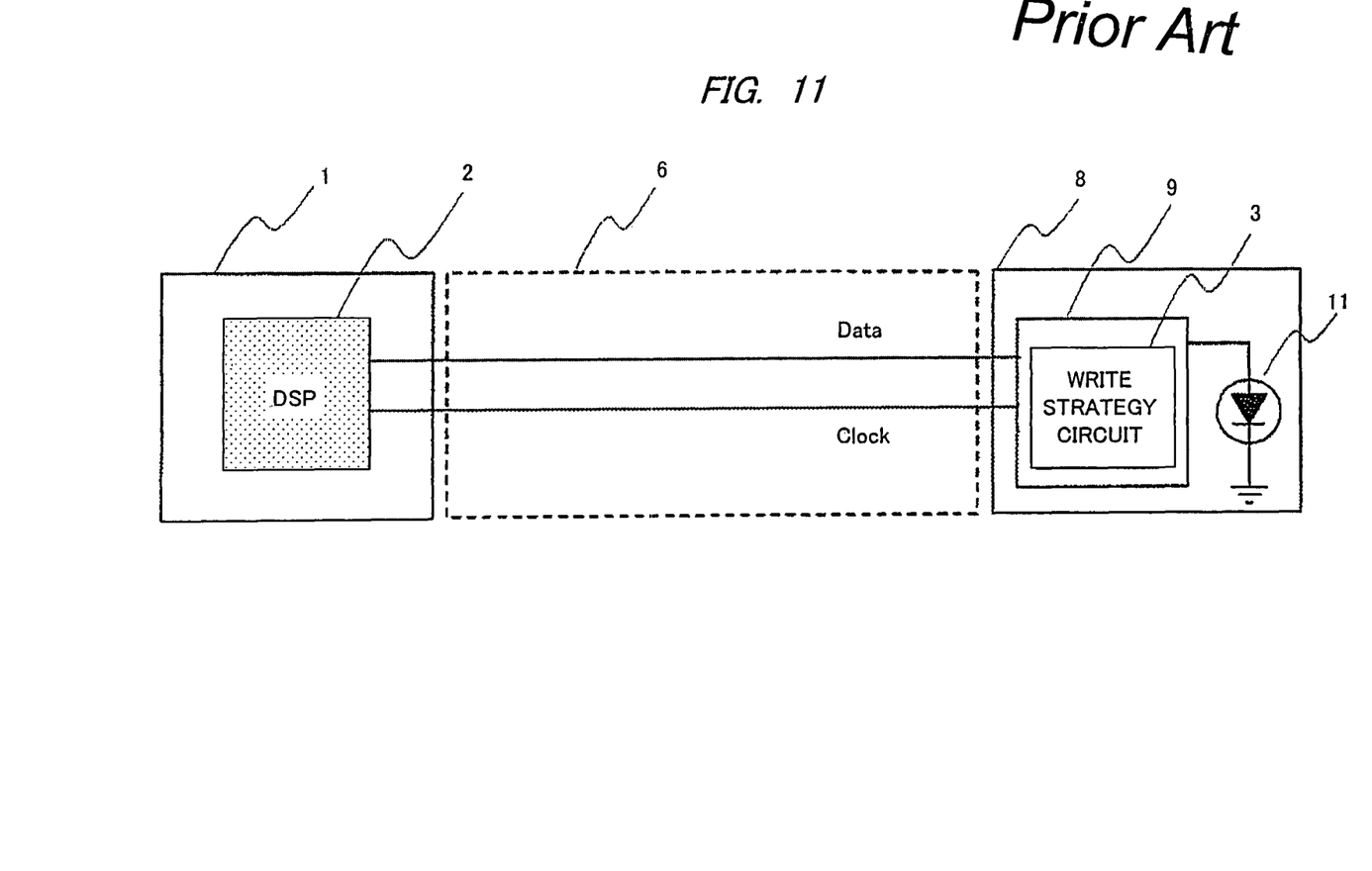
FIG. 11 is a block diagram of a record transmission system in an optical disc drive where a write strategy circuit is provided in a conventional laser diode drive (LDD) chip.

In a conventional optical disc drive compliant with high-speed recording, as shown in FIG. 11, a strategy waveform is produced by transmitting recording data and a clock from a digital signal processor (DSP) LSI to a laser diode driver (LDD) in an optical pick-up (OPU) and using the record data and clocks obtained by dividing the clock by a PLL. To supply a write strategy waveform with high quality to the LD, a write strategy circuit is provided in the LDD near the LD. Since it is difficult to reduce a size of the LDD because of a requirement of current-drive ability, when a complicated circuit for write strategy production is provided in an LDD chip, a chip size for the LDD becomes large, and it results in such a problem as an increase of cost.

Figure 10:
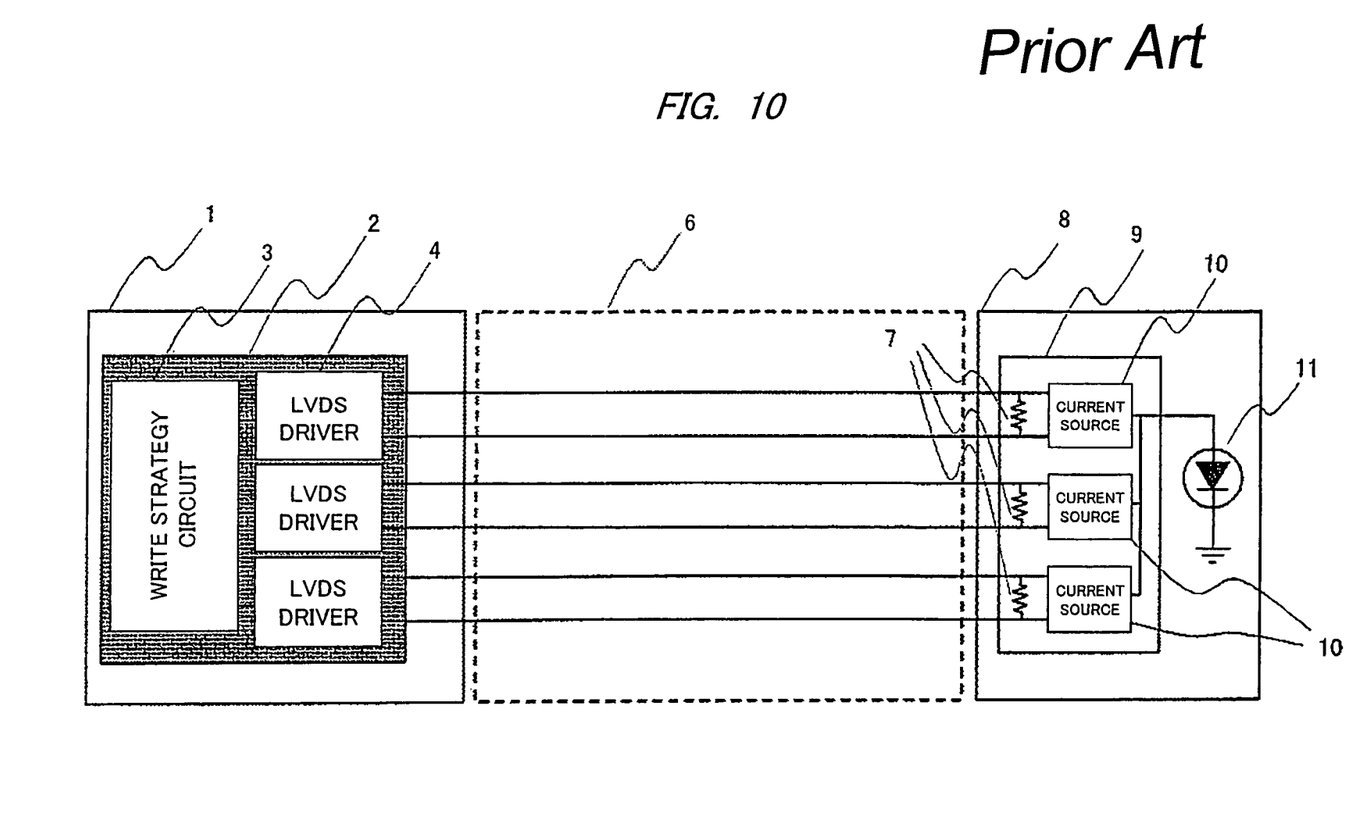
FIG. 10 is a block diagram of an LVDS transmission system of a conventional 3-channel write strategy signal before application of the present invention.

In recent years, therefore, an approach for integrating a write strategy circuit 3 in a DSP 2 manufactured by a CMOS process allowing miniaturization to achieve a chip size reduction of an LDD 9 and cost reduction has been adopted, as shown in FIG. 10. In this system, a 3-channel write strategy signal generated in the DSP 2 is differentially outputted from a low voltage differential signaling (LVDS) driver 4 to be transmitted to the LDD 9 having a termination resistance of 100Ω. Three current sources 10 in the LDD 9 are switched according to ON or OFF of a 3-channel signal to realize a quaternary write strategy waveform. By using the LVDS, low power consumption can be realized, but there is a tendency that an output impedance becomes high.

As a technique regarding an optical disc drive which produces a write strategy signal in the DSP 2 and differentially transmits the same to the LDD 9, there are techniques such as disclosed in Patent Documents 1 and 2.

However, when such a configuration as shown in FIG. 10 is adopted, such a problem that a record error rate deteriorates in high-speed recording which has been available with high quality in a conventional configuration shown in FIG. 11.

A problem to be solved by the invention is to improve an error rate in a high-speed recording in an optical disc drive with a low cost configuration which produces a write strategy signal in the DSP mentioned above to perform an LVDS transmission to the LDD.

A representative example of the present inventions is described below. That is, according to an aspect of the present invention, there is provided an optical disc drive which uses a laser beam for recording data corresponding to a laser drive current pattern on an optical disc comprising: an optical pick-up including a laser diode for generating the optical beam corresponding to the laser drive current pattern and a laser diode driver for producing the laser drive current pattern based on a write strategy signal and outputting the same to the laser diode, thereby driving the laser diode; a digital signal processor including a write strategy circuit for producing the write strategy signal corresponding to the laser drive current pattern and a differential transmission driver for transmitting the write strategy signal produced in the write strategy circuit; a circuit board having the digital signal processor mounted thereon and including a line for transmitting the write strategy signal; a transmission line connecting the circuit board and the laser diode driver to each other, thereby transmitting the write strategy signal; and a differential resistor connected between differential lines of outputs of the differential transmission driver.

According to the present invention, a high-quality recording with a small error rate even in a high-speed recording can be realized according to an optical disc drive having a low-cost configuration which produces a write strategy signal in a DSP and transmits the same to an LDD by an LVDS transmission.

DETAILED DESCRIPTION OF THE PREFERRED EMBODIMENTS

According to the present invention, there is provided an optical disc drive comprising: an OPU including an LD generating a laser beam and an LDD driving the LD; a DSP including a write strategy circuit for producing a laser drive current pattern and an LVDS driver for transmitting a produced write strategy signal; a circuit board having a the DSP mounted thereon and including a line for transmitting the write strategy signal; and a transmission line connecting the circuit board and the LDD for transmitting the write strategy signal, and a resistor is inserted between differential lines of outputs of the LVDS driver in the optical disc drive to solve the abovementioned problem.

More specifically, an effect of the present invention can be obtained by setting a resistance value of the resistor inserted between the differential lines to a value in a range of 80 to 500Ω and determining a position where the resistor is to be inserted between differential lines for LVDS transmission of a write strategy signal on the circuit board, and a higher effect can be obtained by integrating the resistor in the DSP or inserting the resistor at a position near the DSP.

Respective embodiments for carrying out the present invention will be described below with reference to the drawings.

First Embodiment

Figure 1:
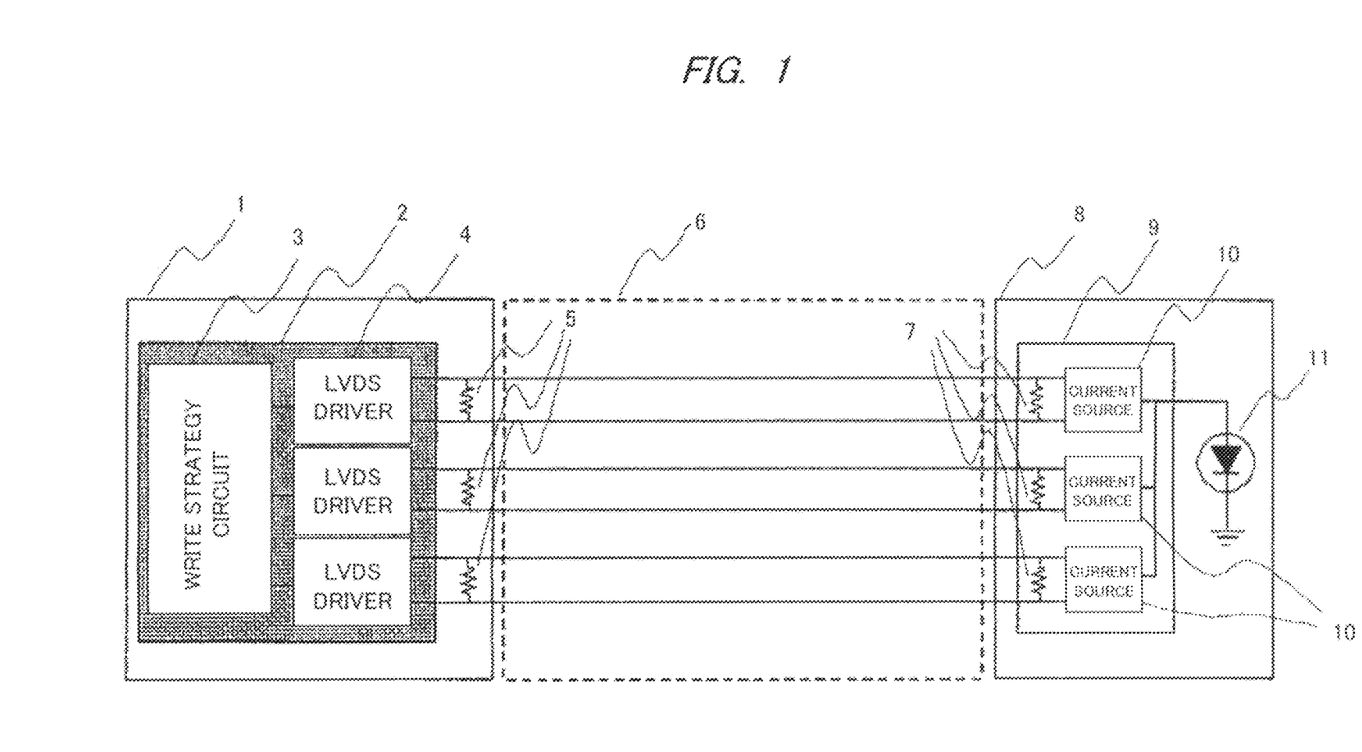
FIG. 1 is a block diagram of an LVDS transmission system using a 3-channel write strategy signal according to the present invention where a resistor is provided between differential lines of output terminals of an LVDS driver outside a DSP.

FIG. 1 is a block diagram showing a circuit configuration of a first embodiment of the present invention.

In an optical disc drive shown in FIG. 1, a circuit board 1 has mounted thereon: a DSP 2 including a write strategy circuit 3 for producing a 3-channel write strategy signal from a modulated record signal and, LVDS drivers 4 for performing an LVDS transmission of the 3-channel write strategy signal; and resistors 5 each being inserted between differential lines of output terminals of each LVDS driver 4.

Figure 9:
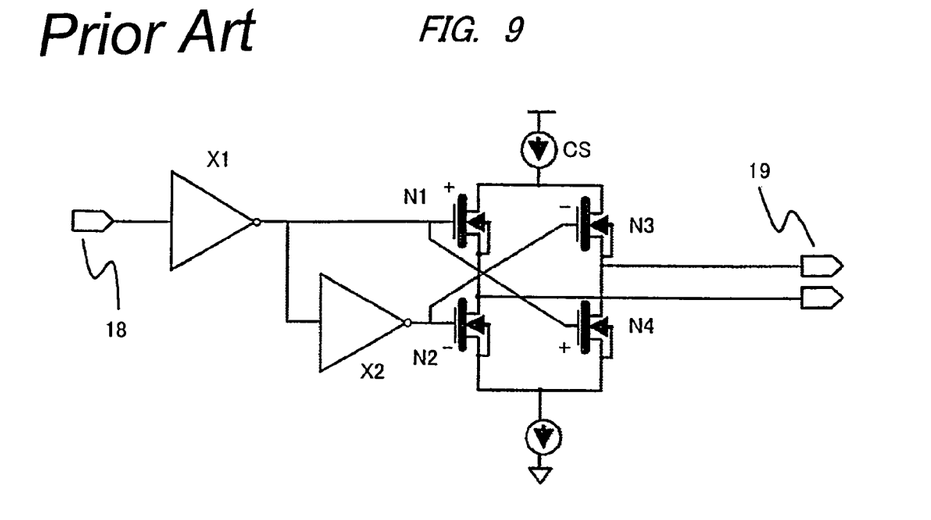
FIG. 9 is a diagram showing a configuration example of a low voltage differential transmission (LVDS) driver.

The LVDS driver 4 is a differential driver of a current source type configured with CMOSs as shown in FIG. 9, and it comprises an input port 18 and two output ports 19 outputting signals having phases opposite to each other.

An OPU 8 includes: terminal resistors 7 which receives 3-channel write strategy signals; three current sources 10 which has a current switching function performed according to ON/OFF of each channel; an LDD 9 which sums these three currents and output the same; and an LD 11 which receives an output from the LDD 9 and emits a laser beam on an optical disc.

A transmission line 6 is a connector for connecting the circuit board 1 and the OPU 8, and a flexible print cable (FPC) or a flexible flat cable (FFC) is connected thereto.

According to the configuration of the present embodiment, pattern jitter can be reduced by suppressing reflected waves (returning waves) at the LVDS drivers 4, and thus recording with a reduced error rate can be realized. The reason thereof, namely, a mechanism bringing the abovementioned effect from the above configuration will be described below.

Figure 8A:
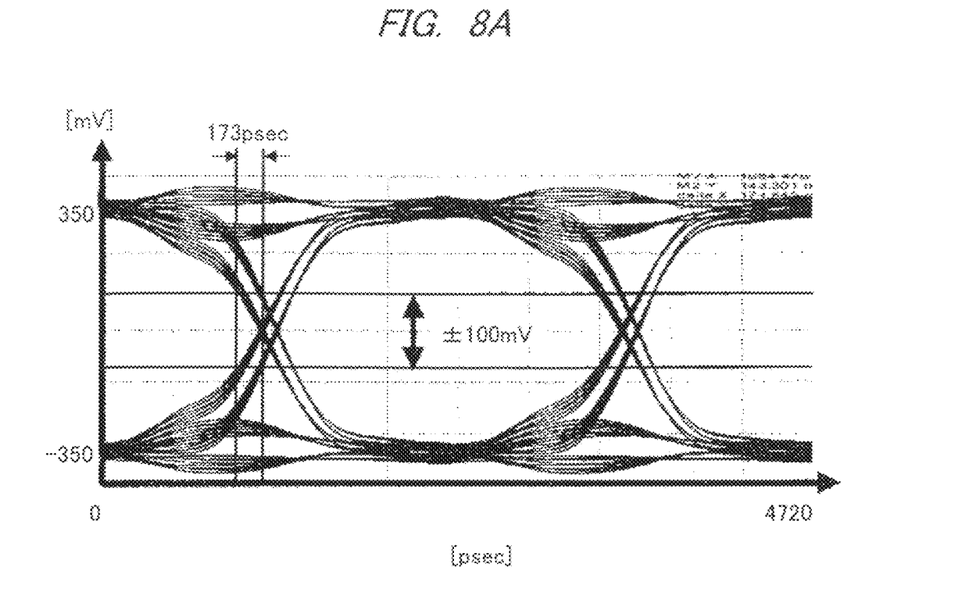
FIG. 8A is a diagram showing an LDD input eye pattern without resistance (conventional example)

In an optical disc drive which produces a write strategy signal inside the DSP 2 and performs an LVDS transmission to the LDD 9 such as shown in FIG. 10, a write strategy input waveform transmitted to the LDD 9 was evaluated to examine the cause of deterioration of the error rate in a high-speed recording. FIG. 8A shows an eye pattern obtained in the case where a pseudo random signal of $2^9-1$ having the minimum pulse width of 2.39 nsec is transmitted for transmission characteristic evaluation. It is understood from FIG. 8A that an eye opening is excellent and a sufficient transmission band can be secured. Accordingly, it can be estimated that the error rate is deteriorated due to jitter observed in the eye opening. Especially, when a recording speed is increased, both a signal interval and the minimum pulse width are reduced so that quality of the write strategy signal is degraded even by slight jitter, as shown in FIG. 6F. When the maximum input sensitivity of the LDD is set to ±100 mV and pattern jitter is defined utilizing the LDD input amplitude of this value, the pattern jitter is 173 psec in FIG. 8A. This is an unignorable value as compared with a pulse width of 2.39 nsec.

Figure 7:
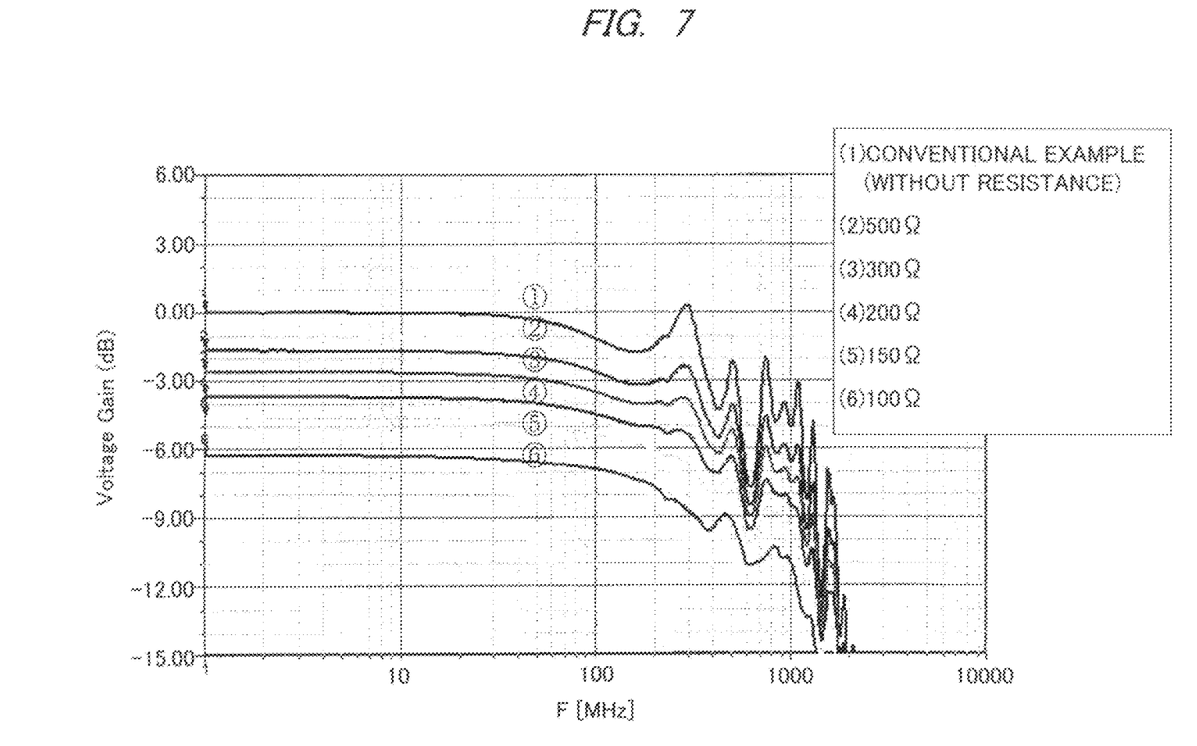
FIG. 7 is a diagram showing transmission characteristics between a DSP and an LDD when a resistance value is changed.

When frequency characteristics of a voltage gain is evaluated from an actual measurement value of transmission characteristics from the DSP 2 to the LDD 9 to figure out the cause of the abovementioned pattern jitter, characteristics shown by (1) in FIG. 7 is obtained. From (1) in FIG. 7, it is understood that swells are present in the frequency characteristics in the high-frequency band, and it can be estimated that interference due to multiple reflections occurs in the frequency band.

Mismatching of the transmission line 6 may be considered as the cause of generation of the reflected wave. The transmission line 6 is made of a flexible material such as a wire, a connector, or a flexible print cable (FPC) on which a write strategy signal flows on the circuit board 1 substrate. Since it is impossible to provide a ground surface on a back surface of a foldable FPC, it is difficult to perform a perfect impedance adjustment compliant with high frequency, and thus it is thought that multiple reflections have been caused by mismatching at a connector connection point or the like.

Generated reflected waves are directed towards the LVDS drivers 4 shown in FIG. 10. Since the LVDS driver 4 is a current source having a high output impedance, the reflected waves are totally reflected here to be directed towards the LDD 9. It may be seen from this that reflected waves reflected in a multiple manner interfere with a write strategy signal, and thus the jitter is generated.

Figure 8B:
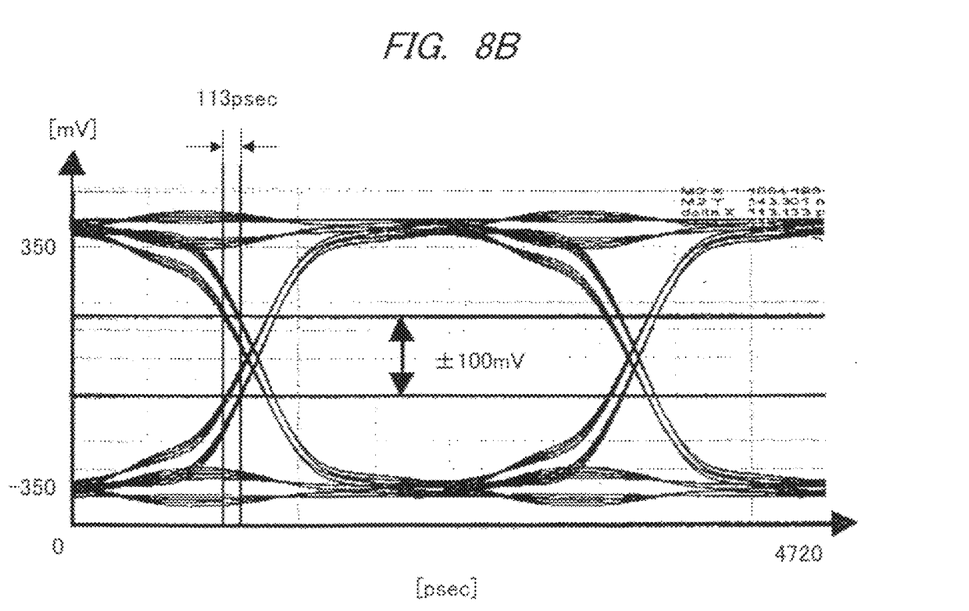
FIG. 8B is a diagram showing an LDD input eye pattern where a resistance value is 500Ω.
Figure 8C:
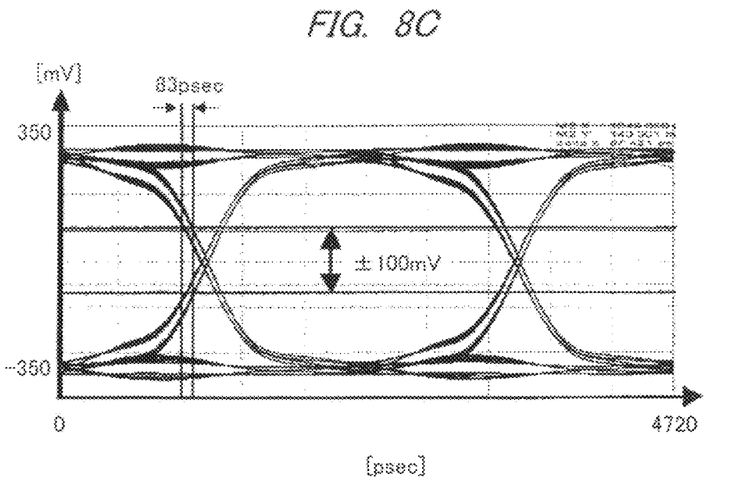
FIG. 8C is a diagram showing an LDD input eye pattern where the resistance value is 300Ω.
Figure 8D:
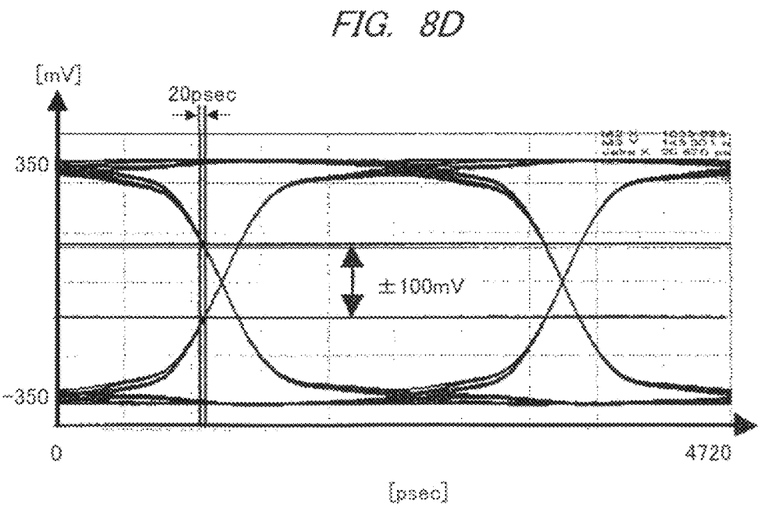
FIG. 8D is a diagram showing an LDD input eye pattern where the resistance value is 100Ω.

Accordingly, in the present embodiment, a resistor 5 is inserted between differential lines of outputs of the LVDS driver 4 based on such a thought that, if the reflection at the output terminal of the LVDS driver 4 can be suppressed, excellent transmission of the write strategy signal is made possible. Eye patterns shown in FIGS. 8B to 8D show such a fact that an effect starts appearing from a value of the resistor inserted is about 500Ω and jitter substantially disappears at a resistor value of 100Ω at which matching with a line impedance can be obtained. As shown by (2) to (6) in FIG. 7, it is understood that swells in high-frequency band are also reduced.

Therefore, according to the present embodiment, such an effect that pattern jitter is reduced by suppressing reflected waves at the LVDS driver 4 so that recording with reduced error rate can be realized.

Next, to confirm the abovementioned effect of the present embodiment, a resistance value of the resistor 5 will be explained referring to specific examples based on the result of experiments which have been uniquely performed by the present inventors. Note that, numerical values shown here are only examples and the present invention is not necessarily limited to these values.

Figure 4:
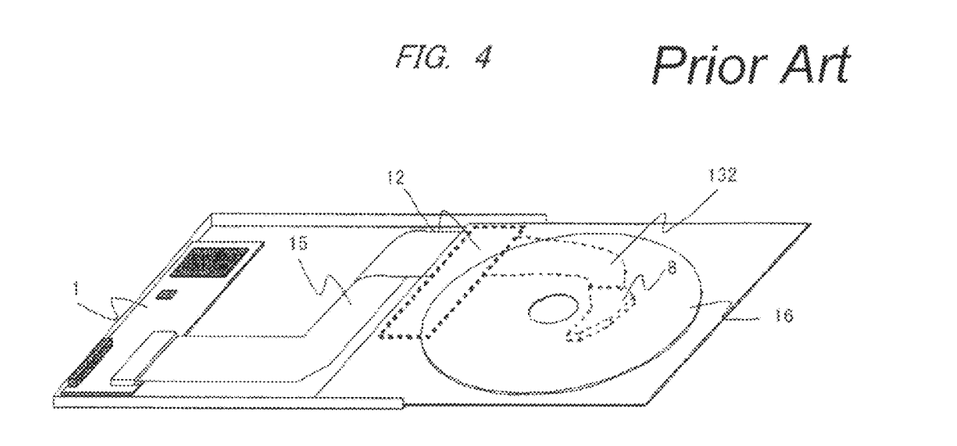
FIG. 4 is a perspective view of a thin optical disc drive using an FPC in a transmission line.
Figure 5:
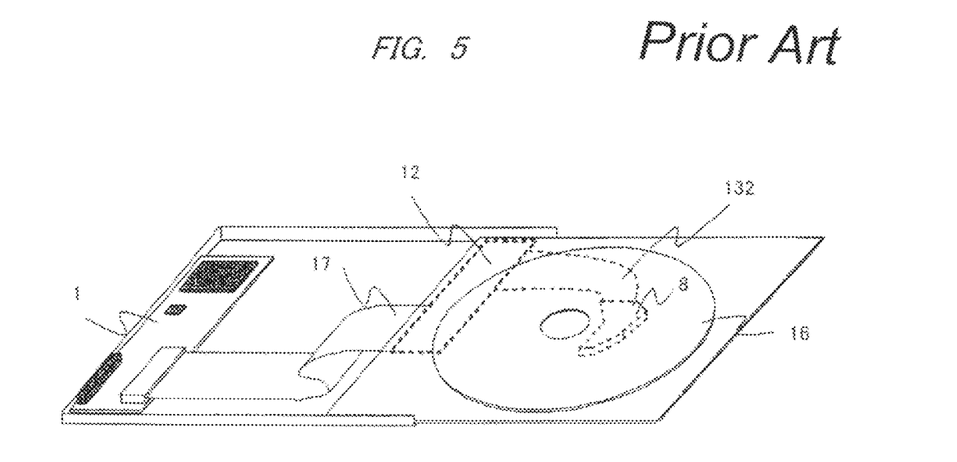
FIG. 5 is a perspective view of a thin optical disc drive using an FPC in a transmission line.

When recording to various DVD-RWs is performed with 8× speed maximum in a thin optical disc drive such as those shown in FIG. 4 and FIG. 5, transmission of a write strategy signal with the minimum pulse width of 2.39 nsec is performed. At this time, since jitter is desired to be about 0.1 nsec or less at minimum, it is necessary to insert a resistor having a resistance value satisfying this value. FIGS. 8A to 8D show evaluations of eye patterns pseudo random signal of $2^9-1$ having a rising time and a falling time of 0.5 nsec) obtained when a resistance value of the resistor 5 is changed, by measuring frequency characteristics of the LVDS transmission line extending from the DSP 2 to the OPU 8 on which a write strategy signal is transmitted. When pattern jitter is defined at ±100 mV under such a condition that signal amplitude of the LVDS driver is ±350 mV and the maximum input sensitivity of the LDD is ±100 mV, the pattern jitter is 173 psec which is a value larger than 0.1 nsec, when the resistor 5 is not provided. When a resistance value of the resistor 5 is set to 500Ω, the pattern jitter becomes 113 psec and an effect of reflected wave reduction appears. Further, when the resistance value is set to 300Ω, the jitter pattern becomes 83 psec. Further, when the resistance value is set to 100Ω, the jitter pattern becomes 20 psec which is less than the targeted value 0.1 nsec or less, thereby realizing recording with high quality where an error rate is reduced.

According to the foregoing, it can be seen that, when a value in a range of about 80 to 500Ω is selected as a resistance value of the resistor 5 inserted between the differential lines considering a parameter of each part configuring the drive, an effective pattern jitter reduction can be obtained.

When the resistance value of the resistor 5 is represented as $R_d$, it is understood that the frequency characteristics of a voltage gain which have been evaluated from the transmission characteristics shown in FIG. 7 are improved regarding roll-off in the low frequency band, and swells in the high frequency band are also reduced, so that secondary reflection at the LVDS driver having a high output impedance is absorbed. However, drive current flowing in the LDD load resistor 7 is multiplied by $1/(1+R_{LDD}/R_d)$, and when Rd is too small, the drive current for the LDD 9 becomes small, and thus the resistor 5 must be selected to have a resistance value which can drive the LDD. Specifically, in an optical disc drive where the output voltage of the LVDS driver 4 is 450 mV (4.5 mA), the drive voltage of the LDD 9 is 350 mV (3.5 mA) or more, and the resistance value of the LDD load resistor 7 is 100Ω, it is preferred that the value of the resistor 5 inserted between differential lines on the output side of the LVDS driver 4 is about 300Ω.

By inserting the resistor 5 satisfying the abovementioned conditions between the differential lines of outputs of the LVDS driver 4 outputting write strategy signals, reflected waves due to impedance variations of the transmission line 6 are reduced, thereby reducing pattern jitter of waveforms of respective write strategy signals as a result, and thus recording with a reduced error rate can be realized.

Second Embodiment

Figure 2:
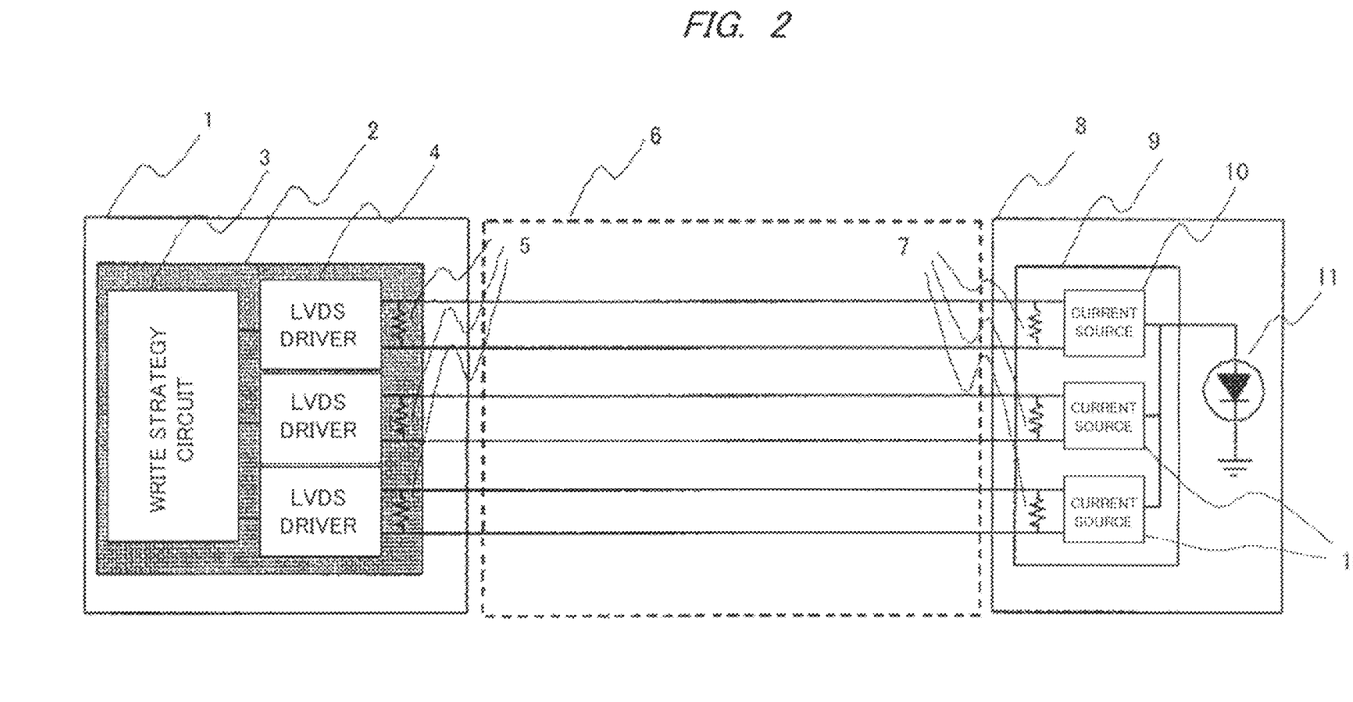
FIG. 2 is a block diagram of the LVDS transmission system using the 3-channel write strategy signal according to the present invention where the resistor is provided between differential lines of output terminals of the LVDS driver inside a DSP.

A second embodiment of the present invention is shown in FIG. 2.

FIG. 2 shows a configuration where the resistors 5, which have been inserted between differential lines outside the DSP 2 outputting 3-channel write strategy signals shown in FIG. 1, are inserted between differential lines on the output side of the LVDS drivers 4 included in the DSP 2 and integrated. The other part of the configuration is the same as that of the first embodiment shown in FIG. 1.

According to the second embodiment, when the resistors 5 are integrated in the DSP 2, a distance from a reflecting point on the output side of the LVDS driver 4 to the resistors 5 is shortened as compared with the case of inserting the resistors 5 between differential lines positioned externally, so that the influence to a write strategy signal due to multiple reflections is reduced. Such a merit can also obtained that a chip on the circuit board 1 can be removed, thereby reducing the area size.

Such an effect can be obtained in the same manner as the first embodiment of the present invention that pattern jitter having a waveform of a write strategy signal is reduced by the resistor 5 inserted between differential lines of outputs of the LVDS driver 4 outputting the write strategy signal so that recording with a reduced error rate can be realized. Further, the reason why the effect can be obtained is similar to that of the first embodiment.

Third Embodiment

Figure 3:
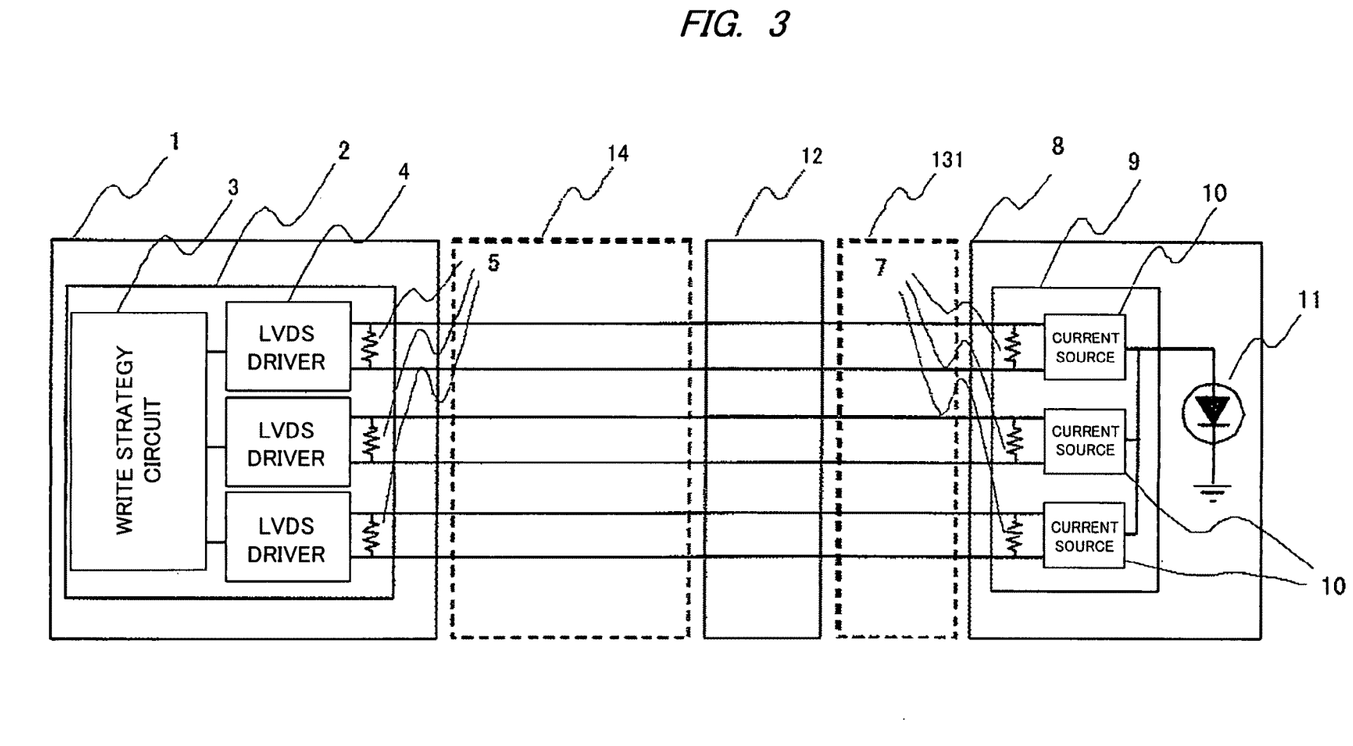
FIG. 3 is a block diagram of an LVDS transmission system using a 3-channel write strategy signal in the present invention where a second circuit board is provided in a transmission line.

FIG. 3 is a block diagram showing a circuit configuration of a thin optical disc drive according to a third embodiment of the present invention. FIG. 4 is a schematic perspective view of the thin optical disc drive shown in FIG. 3. Same portions and parts with those in FIG. 3 are attached with same reference numerals in FIG. 4.

As shown in FIG. 3, the third embodiment is directed to a thin optical disc drive where a second circuit board 12 including a drive circuit for driving a motor is provided between the first circuit board 1 and the OPU 8, and the first circuit board 1 and the second circuit board 12 for the motor are connected by a first transmission line 14 comprising, for example, an FPC 15, and the second circuit board 12 and the OPU 8 are connected by a second transmission line 131 comprising, for example, an FPC 132, and the other configuration is the same as that of the first or second embodiment.

Since the U-shaped FPC 15 in the thin optical disc drive is in contact with a case, as shown in FIG. 4, it has a slight coupling capacitance. In addition, since a contacting state of the FPC 15 with the case is changed according to repetitive use of the thin optical disc drive and the coupling capacitance is also changed, a line impedance of the U-shaped FPC 15 is changed. Thus, reflected waves are generated at the U-shaped FPC 15 by impedance changes which cannot be predicted in its designing stage. Since the thin optical disc drive has the OPU 8 provided at a tray-withdrawing section, a distance from the DSP 2 is long such as 30 cm to 40 cm, so that a write strategy signal is influenced by reflected waves generated due to mismatching in the transmission line.

As shown in FIG. 3, however, an effect same with that of the first embodiment can be obtained by inserting the resistor 5 between differential lines of outputs of the LVDS driver 4. The effect same with that of the second embodiment can be obtained by the resistor integrated in the DSP 2 like the second embodiment of the present invention.

According to the present embodiment, therefore, such an effect can be obtained in write strategy signal transmission of a thin optical disc drive such as shown in FIG. 3 and FIG. 4 that pattern jitter of a waveform of a write strategy signal is reduced so that recording with a reduced error rate can be realized.

Fourth Embodiment

A fourth embodiment of the present invention will be described with reference to FIG. 3 and FIG. 5. FIG. 5 is a schematic perspective view of a thin optical disc drive where an FFC 17 is used instead of the U-shaped FPC 15 of the third embodiment of the present invention shown in FIG. 4, and the other configuration is similar to that of the third embodiment.

It is difficult to adjust the impedance of the FFC 17 as compared with that of the U-shaped FPC 15 and a coupling capacitance of the FFC 17 with the case is large. Since the lines come in contact with each other and the FFC 17 is sandwiched from the above and the below by a metal portion of the case when the tray is closed, the impedance is further lowered. Therefore, the transmission line has a tendency to have a mismatching of impedance due to variations in the contact state with the case or a coupling state of the lines, which are different per product. Accordingly, reflected waves are generated in the thin optical disc drive shown in FIG. 5 more easily than in the thin optical disc drive shown in FIG. 4, so that pattern jitter tends to appear significantly due to the influence.

As shown in FIG. 3, however, an effect same with that of the first embodiment can be obtained by inserting the resistor 5 between differential lines of outputs of the LVDS driver 4. An effect same with that of the second embodiment can be obtained by the resistor 5 integrated in the DSP 2 like the second embodiment of the present invention.

According to the embodiment, therefore, such an effect can be obtained in write strategy signal transmission in a thin optical disc drive such as shown in FIG. 3 and FIG. 5 that pattern jitter of a waveform of a write strategy signal can be reduced, thereby realizing recording with a reduced error rate.

What is claimed is:

1. An optical disc drive that uses a laser beam for recording data corresponding to a laser drive current pattern on an optical disc, the optical disc drive comprising:
an optical pick-up including a laser diode generating the laser beam corresponding to the laser drive current pattern, and a laser diode driver having one or more current sources each including differential inputs and a single output that is connected to the laser diode and a respective first resistor connected between the differential inputs of each current source, the laser diode driver producing the laser drive current pattern based on a sum of one or more differential signals input to the one or more current sources via the differential inputs of the one or more current sources and outputting the laser drive current pattern to the laser diode, thereby driving the laser diode;
a digital signal processor including a write strategy circuit producing a write strategy signal and one or more differential transmission drivers for transmitting the one or more differential signals based on the write strategy signal produced by the write strategy circuit;
a circuit board having the digital signal processor mounted thereon;
differential transmission lines for transmitting the one or more differential signals, connecting the one or more differential transmission drivers and the one or more current sources of the laser diode driver to each other, and transmitting the write strategy signal; and
a respective second resistor connected between the differential transmission lines for each of the one or more differential transmission drivers,
wherein each second resistor is provided in the digital signal processor,
wherein the differential transmission lines comprise a cable that is one of a flexible print cable (FPC) or a flexible flat cable (FFC) and in contact with a metal case of the optical disc drive,
wherein a differential line impedance of the cable changes in response to a contacting state of the cable with the metal case changing due to repetitive use of the optical disc drive,
wherein the optical disc drive includes a tray-withdrawing structure,
wherein a resistance value of each second resistor is a predetermined value in a range of 80Ω to 500Ω, and
wherein a resistance value of each first resistor is 100 Ω.

2. An optical disc drive which uses a laser beam to record data corresponding to a laser drive current pattern on an optical disc, the optical disc drive comprising:
a digital signal processor including a write strategy circuit producing a write strategy signal and one or more differential transmission drivers for transmitting one or more differential signals based on the write strategy signal produced by the write strategy circuit;
a first circuit board having the digital signal processor mounted thereon;
an optical pick-up including a laser diode generating the laser beam corresponding to the laser drive current pattern, and a laser diode driver having one or more current sources each including differential inputs and a single output that is connected to the laser diode and a respective first resistor connected between the differential inputs of each current source, the laser diode driver producing the laser drive current pattern based on a sum of one or more differential signals input to the one or more current sources via the differential inputs of the one or more current sources and outputting the laser drive current pattern to the laser diode, thereby driving the laser diode;
differential transmission lines for transmitting the one or more differential signals, connecting the one or more differential transmission drivers and the one or more current sources of the laser diode driver to each other, and transmitting the write strategy signal;
a second circuit board provided between the first circuit board and the optical pick-up, the second circuit board having mounted thereon a motor drive circuit connected to the differential transmission lines for driving a motor rotating the optical disc; and a respective second resistor connected between the differential transmission lines for each of the one or more differential transmission drivers, and wherein the differential transmission lines comprise a cable that is one of a flexible print cable (FPC) or a flexible flat cable (FFC) and in contact with a metal case of the optical disc drive, wherein a differential line impedance of the cable changes in response to a contacting state of the cable with the metal case changing due to repetitive use of the optical disc drive, wherein the optical disc drive includes a tray-withdrawing structure, wherein a resistance value of each second resistor is a predetermined value in a range of 80Ω to 500Ω, and wherein a resistance value of each first resistor is 100 Ω.

3. The optical disc drive according to claim 2, wherein each second resistor is provided on the first circuit board on which the digital signal processor is mounted.

4. An optical disc drive comprising:

an optical pick-up having one or more pairs of differential inputs and a respective first resistor connected between the differential inputs of each pair of differential inputs, the optical pickup generating an optical beam based on a sum of one or more differential signals input to the optical pick-up via the pairs of differential inputs;

a digital signal processor including a write strategy circuit producing the write strategy signal and one or more differential transmission drivers for transmitting the one or more differential signals based on the write strategy signal;

a circuit board having the digital signal processor mounted thereon;

one or more pairs of differential lines for transmitting the one or more differential signals, connecting each differential transmission driver and the optical pick-up to each other, and transmitting the write strategy signal; and a respective second resistor connected between the differential lines of each pair of differential lines and provided on the circuit board, wherein the one or more pairs of differential lines comprise a cable that is one of a flexible print cable (FPC) or a flexible flat cable (FFC) and in contact with a metal case of the optical disc drive, wherein a differential line impedance of the cable changes in response to a contacting state of the cable with the metal case changing due to repetitive use of the optical disc drive, wherein the optical disc drive includes a tray-withdrawing structure, wherein a resistance value of each second resistor is a predetermined value in a range of 80Ω to 500Ω, and wherein a resistance value of each first resistor is 100 Ω.

5. An optical disc drive comprising:

an optical pick-up having one or more pairs of differential inputs and a respective first resistor connected between the differential inputs of each pair of differential inputs, the optical pickup generating an optical beam based on a sum of one or more differential signals input to the optical pick-up via the pairs of differential inputs;

a digital signal processor including a write strategy circuit producing the write strategy signal and one or more differential transmission drivers for transmitting the one or more differential signals based on the write strategy signal;

one or more pairs of differential lines for transmitting the one or more differential signals, each pair of differential lines connecting an output of a respective differential transmission driver of the one or more differential transmission drivers to the optical pick-up; and a respective second resistor connected between the differential lines of each pair of differential lines and provided in the digital signal processor, wherein the one or more pairs of differential lines comprise a cable that is one of a flexible print cable (FPC) or a flexible flat cable (FFC) and in contact with a metal case of the optical disc drive, wherein a differential line impedance of the cable changes in response to a contacting state of the cable with the metal case changing due to repetitive use of the optical disc drive, wherein the optical disc drive includes a tray-withdrawing structure, wherein a resistance value of each second resistor is a predetermined value in a range of 80Ω to 500Ω, and wherein a resistance value of each first resistor is 100 Ω.

* * * * *